United States Patent [19]

Brenner

[11] Patent Number: 4,569,949

[45] Date of Patent: Feb. 11, 1986

[54] EXPANDABLE SYNTHETIC RESINOUS THERMOPLASTIC PARTICLES, METHOD FOR THE PREPARATION THEREOF AND THE APPLICATION THEREFOR

[75] Inventor: John W. Brenner, Newark, Ohio

[73] Assignee: The Dow Chemical Company, Midland, Mich.

[21] Appl. No.: 745,776

[22] Filed: Jun. 17, 1985

Related U.S. Application Data

[63] Continuation-in-part of Ser. No. 634,082, Jul. 25, 1984.

[51] Int. Cl.⁴ .............................................. C08J 9/14
[52] U.S. Cl. ................................ 521/56; 521/60; 521/147
[58] Field of Search .................... 521/56, 60, 147

[56] References Cited

U.S. PATENT DOCUMENTS

| | | | |
|---|---|---|---|
| Re. 27,927 | 2/1974 | Jablonski | 521/60 |
| 3,058,929 | 10/1962 | Vanderhoff et al. | 521/56 |
| 3,287,286 | 11/1966 | Ohlinger et al. | 521/60 |
| 3,288,731 | 11/1966 | Ingram et al. | 521/56 |
| 3,441,524 | 4/1969 | Burger et al. | 521/60 |
| 3,462,380 | 8/1969 | Rondeu et al. | 521/56 |
| 3,505,248 | 4/1970 | Banks et al. | 521/60 |
| 3,736,273 | 5/1973 | Kobe et al. | 521/60 |
| 3,994,840 | 11/1976 | Kajimura et al. | 521/60 |
| 3,994,841 | 11/1976 | Ikeda et al. | 521/60 |
| 4,080,344 | 3/1978 | Ikeda et al. | 521/60 |

*Primary Examiner*—Morton Foelak
*Attorney, Agent, or Firm*—R. B. Ingraham; M. L. Winkelman

[57] ABSTRACT

Expandable styrene acrylonitrile polymer particles are provided which give good resiliency over an extended period of time.

12 Claims, No Drawings

EXPANDABLE SYNTHETIC RESINOUS THERMOPLASTIC PARTICLES, METHOD FOR THE PREPARATION THEREOF AND THE APPLICATION THEREFOR

This application is a continuation-in-part of copending application Ser. No. 634,082, filed July 25, 1984.

Expandable synthetic resinous particles, the preparation of such particles, expansion of such particles and the fabrication of such particles into various shaped objects is well known in the art. The most common of the expandable particles presently available are expandable polystyrene particles. Many well known shaped articles are prepared by molding such expandable polystyrene particles such as foam plastic cups, foam coolers, various shaped dunnage materials and the like. Such particles of expandable polystyrene generally are available in a variety of sizes, the sizes ranging from less than 1 millimeter to several millimeters in size, prior to expansion. Expandable particles having varied configuration are also known which on expansion provide foamed dunnage material for loose fill packaging. Such expandable polystyrene particles usually consist of a polystyrene matrix having contained therein a volatile fluid foaming agent, oftentimes a chlorofluorocarbon and more frequently an aliphatic hydrocarbon such as pentane. Generally, such particles are expanded or foamed by heating either in hot air, hot liquid or by steam, steam being one of the more frequently employed heating media. Steam provides a convenient and relatively rapid means of heating the particles to a desired foaming temperature. Steam is generally employed as a heating means because of its high heat capacity, rapid transfer of heat to the expanding particle and ready availability. Usually, such expandable particles when heated for a short time with an appropriate heating medium such as steam, often expand to a volume which generally corresponds to a volume somewhat less than the theoretical volume of the volatile fluid foaming agent at the temperature of expansion when the particles are cooled to ambient temperature. In many cases where the permeability of the volatile fluid foaming agent is low relative to the permeability rate of air through the cell walls of the expanded particle, expansion in excess of the theoretical volume as might be determined from the pressure/volume/temperature relationship of the volatile fluid foaming agent may be obtained. This is often referred to as the osmotic effect, wherein additional blowing or expanding capability is obtained by diffusion of the air into the expanded particle at a rate substantially greater than the diffusion of the volatile fluid foaming agent out of the expanded particle. In such instances air is generally considered as a secondary blowing agent. Oftentimes when such particles have been expanded in the presence of air or steam, or air and steam, and the particles are cooled relatively rapidly to ambient temperature, shrinkage is frequently observed wherein the size or volume of the particle appears markedly reduced as the temperature is reduced. Judicious aging of such particles generally in an air atmosphere will result oftentimes in a return of the particles to the original expanded volume. Judicious aging of the particles in an air atmosphere frequently results in additional diffusion of air into the cells resulting in a total pressure within the cells greater than atmospheric pressure, in which case further expansion of the particle can be obtained when heated to an appropriate expanding temperature. Such an expanding temperature is usually from about 20 to 50 degrees centigrade over the glass temperature of the expandable polymer. Spherical and nonspherical particles of the expandable variety advantageously are employed in many instances as loose-fill dunnage materials. Such dunnage materials are commercially available in a variety of configurations that have achieved significant commercial success. The majority of the expandable particles employed in commerce are of a generally spherical configuration and are employed for the molding of a variety of shaped articles. Expandable plastic particles of relatively small diameter are utilized for the molding of the familiar plastic foam cups, often referred to as bead cups, whereas the larger diameter particles are employed for the preparation of shaped dunnage, molding of shaped articles as shaped dunnage, food coolers, insulation board and the like. Some of the expandable plastic particles are employed for the extrusion of foamed sheet which frequently is further shaped into containers, such as are employed in the fast food restaurants, meat trays, egg cartons, apple trays and the like. Expandable synthetic resinous thermoplastic particles have also been employed in the decorative area wherein particles have been adhered to a base, for example paper, and subsequently foamed to provide a desired raised configuration. They also have been molded or shaped into a desired configuration, and decoration subsequently added thereto. The versatility of such synthetic foamable resinous particles and articles prepared therefrom has given rise to considerable commercial activity. There are a variety of modes for the preparation of such particles, a variety of methods for the expansion of such particles, and several methods of molding such particles into shaped articles. Generally, expandable synthetic resinous particles or expanded synthetic resinous particles must be molded within a relatively limited temperature range, the temperature must be sufficiently high to cause expansion of the particle and fusion of the particles with adjacent particles to form a unitary body. However, the temperature must not be sufficiently high that the molded articles collapse. Generally, if such particles are heated excessively and collapse during or after molding, the resultant molded body will have a volume less than the volume of the mold and consequently a shape which is usually undesired. In order to broaden the operable molding range of expandable synthetic resinous thermoplastic particles, some particles having been designated as thermal collapse resistant particles. Usually such particles are prepared employing a very minor amount of crosslinking agent which extends, considerably, the temperature range over which they may be utilized or expanded. Such crosslinking is most often accomplished during the polymerization of the particles. The quantity of the crosslinking agent employed to prepare thermal collapse resistant particles varies over a generally narrow range and provides usually generally only sufficient crosslinking to render the particles swellable but insoluble in a solvent for a corresponding polymer prepared without benefit of a crosslinking agent. Usually the desired amount of crosslinking agent is that which is sufficient to render the particles insoluble and yet exhibit a maximum, or at least a close to maximum, degree of swelling when placed in a solvent for the linear polymer.

A large number of United States Letters patent exist which are concerned with expandable synthetic resinous thermoplastic particles as dunnage and with the preparation of such particles, the expansion of such particles, equipment for the expansion of the particles and molding of the particles. A representative number of these patents are set forth below, the teachings of which are herewith incorporated by reference thereto: U.S. Pat. Nos. 2,275,164; 2,409,910; 2,532,243; 2,681,321; 2,779,062; 2,848,427; 2,848,428; 2,860,378; 2,875,186; 2,878,194; 2,884,386; 2,941,964; 2,952,594; 2,986,537; 3,015,851; 3,026,272; 3,026,273; 3,026,274; 3,027,335; 3,033,805; 3,056,753; 3,058,162; 3,058,926; 3,058,929; 3,060,138; 3,060,513; 3,126,354; 3,207,820; 3,400,037; 3,424,827; 3,461,088; 3,468,820; 3,484,262; 3,505,249; 3,577,360; 3,598,769; 3,639,551; 3,657,164; 3,738,020; 3,887,672; 3,878,133; 3,956,203; 3,975,327; 4,027,064; 4,029,614; 4,147,845; 4,173,608; 4,174,430; 4,226,942; 4,446,208.

Generally, the products prepared from such expandable particles may be classified into two general categories. One, low density, usually having a density of from about one pound per cubic foot to about 3 pounds per cubic foot and high density foams which often have densities ranging from about 20 to 30 pounds per cubic foot. For many applications, it is desired to have low density foamed articles, and for many applications densities desirable are even lower. Most foams fabricated from polystyrene are relatively stiff and non-resilient and are what may be considered to be relatively rigid foams. For example, many of these foams when crushed to 10 percent of their original volume do not readily recover to a dimension even approximating their original dimension prior to crushing. A general goal in the preparation of synthetic resinous foamed articles from expandable synthetic resinous foamed particles is to obtain maximum volume having maximum physical properties and employing the minimum quantity of raw materials. When the term density is employed, it refers to the true density of a particle or molded article and not to the bulk density of a plurality of particles. Bulk density shall be specified as such. The prior art refers to some expanded particles and articles having density below about 1 pound per cubic foot. However, such particles and articles in general have been very brittle, and althouqh of low density have had physical properties such that they have been of no commercial significance. Such low density materials may have found some limited applications, but in general have not been significant in the commercial field. Low density expanded synthetic resinous particles may be molded into shapes of various types. However, if the resultant product is brittle, it is usually not satisfactory for practical applications. For example, in the field of thermal insulation, a sheet of insulation, for example 4 feet by 8 feet or 2 feet by 8 feet, must have substantial physical resistance to mechanical handling for installation in order to be of commercial desirability. Breakage of such sheets is expensive both from a material standpoint and from the standpoint of the additional labor required to either repair or replace such articles. Many of these expanded particles are of a resilient nature such as those disclosed in patent applications Ser. No. 493,194, filed May 10, 1983, and Ser. No. 600,751, filed Apr. 16, 1984, now U.S. Pat. No. 4,485,193, exhibit a desirable degree of resilience; however, on aging at ambient conditions for relatively short periods of time exhibit an undue reduction of dynamic cushioning ability.

It is therefore an object of the present invention to provide an expandable synthetic resinous particle which may be expanded to a density of less than 2 pounds per cubic foot which can be formed into a foam body which is resilient and retains desirable resiliency for extended periods of time.

It is also a further object of the invention to provide such particles which have a relatively long shelf life without the requirement of refrigeration.

It is a further object of this invention to provide a method for the preparation of such particles.

A further object of the invention is to provide a method for the foaming of such particles to provide a foamed particle of a desired low density.

Also included within the objects of this invention is a method for the preparation of molded articles of low density, prepared from particles in accordance with the present invention.

These benefits and other advantages in accordance with the present invention are obtained in a plurality of heat expandable styrene-acrylonitrile synthetic resinous copolymer particles, the particles having polymerized therein at least 8 to 40 weight percent acrylonitrile with the remainder being primarily styrene to provide a benzene soluble polymer having a weight average molecular weight of from about 100,000 to about 500,000 molecular weight units, the particles having disposed therein a volatile fluid expanding agent selected from the group consisting of 1,1-dichloro-1-fluoro-2-chloro-2,2-difluoroethane; 1-chloro-1,1-difluoro-2-chloro-2,2-difluoroethane; neopentane; tetramethylsilane; and mixtures thereof; with the further limitations that when the particles are heated to a temperature above the glass transition temperature of the polymer, they expand to at least 40 times their original volume at ambient temperature, with the further limitation that particles expanded to from 30 to 40 times their unexpanded volume retain at least 75 weight percent of the volatile fluid foaming agent when contained in an open container in a recirculating air oven at 60 degrees centigrade for 30 days.

Also contemplated within the scope of the present invention is a plurality of expanded synthetic resinous particles, the particles being heat expandable styrene-acrylonitrile synthetic resinous copolymer particles, the particles having polymerized therein at least 8 to 40 weight percent acrylonitrile with the remainder being primarily styrene to provide a benzene soluble polymer having a weight average molecular weight of from about 100,000 to about 500,000 molecular weight units, the particles having disposed therein a volatile fluid expanding agent selected from the group consisting of 1,1-dichloro-1-fluoro-2-chloro-2,2-difluoroethane; 1-chloro-1,1-difluoro-2-chloro-2,2-difluoroethane; neopentane; tetramethylsilane; and mixtures thereof with the further limitations that when the particles are heated to a temperature above the glass transition temperature of the polymer, they expand to at least 40 times their original volume at ambient temperature, with the further limitation that particles expanded to from 30 to 40 times their unexpanded volume retain at least 75 weight percent of the volatile fluid foaming agent when contained in an open container in a recirculating air oven at 60 degrees centigrade for 30 days.

Also contemplated within the scope of the present invention is a method for the preparation of a resilient coherent foamed body, the body having a density of from about 0.5 pound per cubic foot to about 2 pounds per cubic foot, the steps of the method comprising providing a plurality of heat expandable synthetic resinous particles, the particles being heat expandable styrene-acrylonitrile synthetic resinous copolymer particles, the particles having polymerized therein at least 8 to 40 weight percent acrylonitrile with the remainder being primarily styrene to provide a benzene soluble polymer having a weight average molecular weight of from about 100,000 to about 500,000 molecular weight units, the particles having disposed therein a volatile fluid expanding agent selected from the group consisting of 1,1-dichloro-1-fluoro-2-chloro-2,2-difluoroethane; 1-chloro-1,1-difluoro-2-chloro-2,2-difluoroethane; neopentane; tetramethylsilane; and mixtures thereof; with the further limitations that when the particles are heated to a temperature above the glass transition temperature of the polymer, they expand to at least 40 times their original volume at ambient temperature, the steps of the method comprising: heating the particles to cause expansion thereof and provide expanded particles, confining a mold filling quantity of the expanded particles in a mold, heating the mold and particles therein to cause further expansion of the expanded particles and to cause the particles in the mold to bond together to form a unitary body and subsequently removing the body from the mold.

Also contemplated within the scope of the present invention is a coherent unitary foamed body of twice-expanded particles in closely adjacent relationship to each other, the adjacent particles being fused together to thereby provide a molded shaped article having a density of from about 0.5 pounds per cubic foot to about 2 pounds per cubic foot, beneficially the density being from about 0.7 to 1.5 pounds per cubic foot and advantageously from about 0.7 to 1 pound per cubic foot of said particles.

Also contemplated within the scope of the present invention is a method for the preparation of coherent foamed bodies in accordance with the present invention having a density of from about 0.5 pound per cubic foot to about 2 pounds per cubic foot and advantageously from about 0.7 to 1 pound per cubic foot, such bodies being resilient after a commercially useful period of time.

Polymers suitable for the practice of the present invention are copolymers of minor portions of acrylonitriles with major portions of a styrenic monomer. By styrenic monomer is meant a monomer such as styrene, any of the ethyl toluenes, alpha-methylstyrene and the like, wherein the alkyl substitution can be up to 1 carbon atom on the vinyl group and up to 4 carbon atoms on the benzene ring. Useful acrylonitriles include acrylonitrile, methacrylonitrile, ethacrylonitrile and the like. Such monomers may be employed alone or in combination with each other. Acrylonitrile can be employed as 8 to 40 weight percent copolymer, beneficially 15 to 35 weight percent, and advantageously 15 to 25 percent wherein at least the majority of the remaining monomer is of the vinyl aromatic nature and preferably all of the remaining vinyl aromatic monomer polymerized in the copolymer being of a vinyl aromatic or at least an alkyl aromatic composition such as styrene and alpha-methylstyrene.

Expandable particles in accordance with the present invention may be prepared from a wide variety of monovinyl monomeric materials which are subject to addition polymerization. An essential feature of the material from which articles in accordance with the present invention may be prepared is that monomeric materials employed undergo addition polymerization to form a thermoplastic polymer. It is critical to the preparation of particles and articles in accordance with the present invention that the base weight average molecular weight be from 100,000 to 500,000 grams per mole.

A wide variety of free radical polymerization methods are suitable. Suspension polymerization or so-called mass process may be employed. Various methods of obtaining expandable acrylonitrile beads are set forth in the following U.S. Pat. Nos.: 3,505,249; 3,878,133; 3,922,255; and 4,444,961, the teachings of which are herewith incorporated by reference thereto. Such polymerization techniques are well known in the art. Blowing agents suitable for the practice of the present invention include 1,1-dichloro-1-fluoro-2-chloro-2,2-difluoroethane; 1-chloro-1,1-difluoro-2-chloro-2,2-difluoroethane; neopentane; tetramethylsilane; and mixtures thereof.

In the event that the polymerization equipment offers option of a high heat transfer rate, the polymerization may be conducted at a higher rate of conversion than if equipment were employed which permitted only a relatively low rate of heat transfer. Such polymerizations are generally of an exothermic nature. Removal of the heat of polymerization is generally necessary to obtain a polymer having a desired weight average molecular weight.

A critical characteristic that the primary blowing agent must possess is that the diffusion rate of the primary blowing agent through polymeric cell walls of an expanded particle is relatively slow. Blowing agents may be employed alone or as a mixture of blowing agents. There are two principle methods for the incorporation of the primary blowing agent within the expandable particles. These two methods may be referred to as the "polymerize in" or "steep in" methods. Employing the polymerize in method, the primary blowing agent is admixed with the monomeric material prior to polymerization into expandable particles in accordance with the invention. On polymerization of the monomeric material, the primary blowing agent is generally uniformly distributed within such particles and the product of the polymerization is an expandable bead in accordance with the present invention. The second process, or steeping-in process requires the formation of the polymer particle prior to the addition of the primary blowing agent. Such a steeping-in process may be accomplished by the addition of a primary blowing agent during or on completion of the suspension polymerization step. For example, when the polymerization is partially complete, by way of nonlimiting illustration when at least about one-half of the monomer has been converted to polymer, the primary blowing agent may be added to the reactor. The primary blowing agents are organic in nature. They are preferentially incorporated into the polymer particles rather than in the suspending water phase employed for the suspension polymerization. Alternatively, to the aqueous steep-in process is the so called dry process, wherein after polymerization of the monomeric material in the polymer particles is complete insofar as practical purposes are concerned, the particles generally do not need to be treated further with an anticlumping agent in contrast to conventional expandable particles. Advantageously, such a dry steeping-in process may be conducted at any temperature below that at which the particles exhibit a significant tendency to adhere to each other, such temperature being dependent in part upon the glass transition temperature of the polymer. Any coating such as particulate clay which has been applied to the particles to prevent agglomeration thereof, during the steeping operation, may or may not be removed by appropriate washing after impregnation with blowing agent.

Beneficially the volatile fluid foam or blowing agent is incorporated in the unexpanded particle at a level of from about 5 to 40 weight percent of the expandable particle. Beneficially, a foaming agent level of from 15 to 30 weight percent is quite useful, and most advantageously the foaming agent level is from about 15 to 25 weight percent.

The first or primary expansion of particles in accordance with the present invention is readily accomplished employing techniques well known in the art, such as exposing the particles to hot air or steam at atmospheric pressure, subatmospheric pressure or superatmospheric pressure, depending on the particular polymer utilized and the glass transition temperature of such a polymer. In the event that styrene is utilized as the principle monomeric component in the preparation of particles in accordance with the invention, steam is sufficient to cause the first expansion of the particles to a volume approximating that of the volume of the volatile fluid blowing agent contained therein which would be expected at the temperature of expansion. Alternatively, such particles may be first expanded by exposure to heated inert gas such as air, nitrogen or the like which is nonreactive with the polymer under conditions of expansion. Such expansion may occur in an oven or an expander designed specifically for expandable particles. Alternatively, such an expansion may take place by immersing the particles in a heated liquid for example, hot water. After the initial or primary expansion of particles in accordance with the invention the particles may be aged with or without cooling in a gas such as air, nitrogen, or the like which has a permeability rate through the cell walls of the polymer greater than the permeability rate of the primary blowing agent through the cell walls of the foamed particles. Generally, on heating in such an inert atmosphere, the particles have a tendency to expand even further. Unexpanded particles in accordance with the present invention having an average particle size of about 1 millimeter and within the range of 0.5 to 1.5 millimeters when heat expanded to between 30 to 40 volumes, retain at least 75 weight percent of the volatile fluid foaming agent based on the foaming agent content of the freshly expanded particle after storing in an open container at 60° centigrade for a period of 30 days. Generally unexpanded particles in accordance with the present invention have sizes within the range of 0.2 to 4 millimeters.

Desirable low density particles can be obtained by prolonged heating at atmospheric pressure in air or by heating for very short periods at subatmospheric pressure and subsequently allowing the particles to reinflate at atmospheric pressure.

Temperatures employed in the molding of particles in accordance with the present invention, are generally commensurate with those employed in the molding of higher density articles, which are normally obtained from conventional expandable synthetic resinous particles. For most purposes, particles in accordance with the present invention are generally spherical in nature. Such spherical particles may be prepared by suspension polymerization of an appropriate monomer and primary organic blowing agent in aqueous suspension in the presence of appropriate catalysts or polymerization initiators. Alternatively, particles may be obtained by the extrusion of strands of circular or other cross-sectional configuration, cutting the strands into short lengths, short lengths meaning particles having a length approximating the maximum cross-sectional dimension of the strand; for example, cylinders having a length of from one-half to two and one-half times the diameter of the strand. Such particles generally may be dispersed in an inert dispersing medium, such as water, and heated above the glass transition temperature of the polymer, whereupon the surface tension forces the elongate particles to assume a generally spherical configuration. Such particles may or may not contain the organic volatile blowing agent. If such particles contain the volatile fluid foaming agent, such heating is generally done under pressure. Alternatively, the particles may be impregnated with the volatile fluid foaming agent while simultaneously being heated to provide particles having the desired spherical configuration.

Oftentimes in the preparation of synthetic resinous thermoplastic dunnage materials, a configured ribbon of material may be extruded. For example, such a ribbon may have a tri-lobal configuration or an S-shaped configuration, the extruded strand being rapidly quenched in a cooling medium, for example, cold water; so that on extrusion the ribbon containing the volatile fluid foaming agent does not foam or expand, and the ribbon is severed into short lengths which may subsequently be expanded through a primary expansion step and a secondary expansion step in the manner hereinbefore described to provide low density desirable dunnage materials.

As the expandable particles in accordance with the present invention achieve their highly desirable low density, most often by means of sequential expansion steps, it is desirable that the volatile fluid organic foaming or blowing agent preferentially remain within the polymer, that is, blowing agent loss from the particle be relatively low. Generally, on the initial expansion of an expandable particle in accordance with the present invention, primary blowing or primary expansion is caused by the vaporization of the volatile fluid organic blowing agent when the polymer is held at a desired heat plastifying temperature for a relatively short period of time; for example, less than 30 minutes, and beneficially less than 10 minutes, and desirably less than 5 minutes.

EXAMPLE I

A suspension polymerization process was employed to prepare expandable styrene-acrylonitrile copolymer particles in accordance with the invention. An agitated one-gallon jacketed reaction vessel was employed. The reactor was charged with 780 grams of styrene, 280.8 grams of 1,1-dichloro-1-fluoro-2-chloro-2,2-difluoroethane, hereinafter referred to as CFC-113; 2.89 grams of benzoyl peroxide and 195 grams of acrylonitrile. The reactor was sealed and agitated for a period of 15 minutes. The agitator was operated at 250 revolutions per minute. At the end of the 15 minute period, the agitator was stopped and the following components added. 1250 Grams of water; 4.1 grams of carboxymethylmethylcellulose; 0.55 gram of sodium dichromate and 0.08 gram of sodium nitrite. Agitation was resumed and the vessel and contents heated to 82° C. for a period of 8.3 hours. At the end of that period, the temperature was raised to 120° C. and maintained at that temperature for a period of 2 hours. The reaction mixture was initially agitated at 105 revolutions per minute for a period of three hours. At the end of the three hour period, the agitation was increased to 180 revolutions per minute for the duration. At the end of the three hour period, the contents of the reactor were cooled and the resultant polymer particles separated and dried. The particles contained 20 weight percent CFC-113. The polymer had a molecular weight of 387,000 grams per mole. A portion of the particles recovered from the reactor were expanded by exposing them to atmospheric steam for a period of 9 minutes. The expanded particles had a bulk density of about 1 pound per cubic foot. The expanded particles were maintained under ambient temperature and pressure for a period of about 48 hours. A mold was provided having a cavity measuring about 6.5 by 6.5 by 2 inches. The mold was filled with expanded particles and a molding prepared by applying 8 pounds per square inch gauge steam to the particles in the mold for a period of 1.5 minutes followed by a 15 seconds waiting period, and the mold and contents subsequently subjected to cooling water for a period of 15 seconds; the molding providing a well knitted relatively smooth surface block having a bulk density of about 1.1 pounds per cubic foot. The block was sectioned to provide test specimens and subjected to blowing agent analyses and drop tests over an extended period of time. The aging time in days blowing agent content and peak deceleration in gravities (G's) as two different loadings are set forth in Table I. Drop testing was done in accordance with ASTM D-1596-78A.

For purposes of comparison, two other specimens were prepared, one by repeating the foregoing procedure with the exception that the blowing agent was a mixture of equal parts of normal pentane and trichlorofluoromethane to provide a total blowing agent concentration of 10 weight percent of the unexpanded particle. The steam pressure used was 7 pounds per square inch.

A second comparative polymer was made wherein the monomer employed was styrene containing 0.4 weight percent divinyl benzene. The blowing agent was present at a level of 18.5 weight percent and comprised 11 weight percent dichloro-difluoromethane and 7.5 weight percent of the unexpanded particle was trichlorofluoromethane. Molding was done at a steam pressure of 20 pounds per square inch.

The results are set forth in Table I wherein the foamed particles were stored under ambient conditions for the time in days indicated together with the percent blowing agent remaining. In the drop testing, the peak deceleration in the second through fifth drops were averaged under two different loads as indicated in Table I. All drop tests were continued using a 24-inch drop height. All specimens had a density of 1.1 pound per cubic foot. Specimen 1 is in accordance with the present invention. Specimen 2 is the styrene acrylonitrile polymer with normal pentane and halogenated methane. Specimen 3 is the lightly crosslinked polystyrene.

TABLE I

| Specimen | Aging Time Days | Percent Blowing Agent | 1 Inch** 2nd–5th G's 0.48 psi* load | 1 Inch** 2nd–5th G's 0.92 psi* load |
|---|---|---|---|---|
| 1 | 0 | 15.7 | 74 | 84 |
|  | 30 | 14.7 | 76 | 83 |
|  | 60 | 15.8 | 76 | 85 |
|  | 117 | 15.5 | 76 | 90 |
| 2 | 0 | 6.5 | 74 | 91 |
|  | 39 | 3.8 | 81 | 101 |
|  | 80 | 3.2 | 84 | 100 |
|  | 150 | 1.9 | 83 | 110 |
| 3 | 0 | 9.5 | 78 | 96 |
|  | 39 | 3.0 | 88 | 109 |
|  | 80 | 0.8 | 86 | 118 |
|  | 154 | 0.4 | 87 | 118 |

*psi = pounds per square inch
**specimen thickness

As is readily apparent from Table I, Specimen 1 in accordance with the present invention retains blowing agent much more effectively than in comparative Specimens 2 and 3, and the peak deceleration of the specimen in accordance with the invention stays relatively constant with time and does not exhibit as sharp a rise with time as do Specimens 2 and 3.

EXAMPLE II

A copolymer in accordance with the invention was prepared in accordance with the procedure of Example I to provide unexpanded particles having diameters in a range from 0.7 to 1 millimeter and contained 19.5 percent of CFC-113. The particles were expanded by a seven-minute exposure to atmospheric steam to provide expanded particles having a bulk density of 0.95 pound per cubic foot. After expansion, the particles were stored in an open container in the air oven at a temperature of 60 degrees centigrade. Periodically the particles were sampled and analyzed for blowing agent content.

Table II, under the column "Days" indicates the number of days particles were stored in the oven and under the column headed "BA" is indicated the weight percent blowing agent found at the corresponding time.

TABLE II

| Days | Blowing Agent |
|---|---|
| 0 | 17.9% |
| 1 | 17.0% |
| 2 | 16.6% |
| 4 | 16.7% |
| 7 | 16.4% |
| 10 | 16.5% |
| 15 | 15.8% |
| 20 | 15.8% |
| 30 | 16.6% |
| 67 | 16.2% |

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A plurality of heat expandable styrene-acrylonitrile synthetic resinous copolymer particles, the particles having polymerized therein at least 8 to 40 weight percent acrylonitrile with the remainder being primarily styrene to provide a benzene soluble polymer having a weight average molecular weight of from about 100,000 to about 500,000 molecular weight units, the particles having disposed therein a volatile fluid expanding agent selected from the group consisting of 1,1-dichloro-1-fluoro-2-chloro-2,2-difluoroethane; 1-chloro-1,1- difluoro-2-chloro-2,2-difluoroethane; neopentene; tetramethylsilane; and mixtures thereof; with the further limitations that when the particles are heated to a temperature above the glass transition temperature of the polymer, they expand to at least 40 times their original volume at ambient temperature, with the further limitation that particles expanded to from 30 to 40 times their unexpanded volume retain at least 75 weight percent of the volatile fluid foaming agent when contained in an open container in a recirculating air oven at 60 degrees centigrade for 30 days, with the further limitation that the particles are moldable into a resilient foam body having a density of less than 2 pounds per cubic foot which is resilient and retains desirable resiliency for extended periods of time.

2. The particles of claim 1 wherein the acrylonitrile content is from about 15 to 35 weight percent.

3. The particles of claim 2 wherein the acrylonitrile content is from about 20 to 30 weight percent.

4. The particles of claim 1 wherein the volatile fluid expanding agent is 1,1-dichloro-1-fluoro-2-chloro-2,2-difluoroethane.

5. A plurality of heat expanded styrene-acrylonitrile synthetic resinous copolymer particles, the particles having polymerized therein at least 8 to 40 weight percent acrylonitrile with the remainder being primarily styrene to provide a benzene soluble polymer having a weight average molecular weight of from about 100,000 to about 500,000 molecular weight units, the particles having disposed therein a volatile fluid expanding agent selected from the group consisting of 1,1-dichloro-1-fluoro-2-chloro-2,2-difluoroethane; 1-chloro-1,1-difluoro-2-chloro-2,2-difluoroethane; neopentene; tetramethylsilane; and mixtures thereof; with the further limitation that particles expanded to from 30 to 40 times their unexpanded volume retain at least 75 weight percent of the volatile fluid foaming agent when contained in an open container in a recirculating air oven at 60 degrees centigrade for 30 days, with the further limitation that the particles are moldable into a resilient foam body having a density of less than 2 pounds per cubic foot which is resilient and retains desirable resiliency for extended periods of time.

6. The particles of claim 5 wherein the acrylonitrile content is from about 15 to 35 weight percent.

7. The particles of claim 6 wherein the acrylonitrile content is from about 20 to 30 weight percent.

8. The particles of claim 5 wherein the volatile fluid expanding agent is 1,1-dichloro-1-fluoro-2-chloro-2,2-difluoroethane.

9. A resilient molded body of heat expanded styrene-acrylonitrile synthetic resinous copolymer particles, the particles having polymerized therein at least 8 to 40 weight percent acrylonitrile with the remainder being primarily styrene to provide a benzene soluble polymer having a weight average molecular weight of from about 100,000 to about 500,000 molecular weight units, the body having disposed therein a volatile fluid expanding agent selected from the group consisting of 1,1-dichloro-1-fluoro-2-chloro-2,2-difluoroethane; 1-chloro-1,1-difluoro-2-chloro-2,2-difluoroethane; neopentane; tetramethylsilane; and mixtures thereof.

10. The body of claim 9 wherein the acrylonitrile content is from about 15 to 35 weight percent.

11. The body of claim 10 wherein the acrylonitrile content is from about 20 to 30 weight percent.

12. The body of claim 10 wherein the volatile fluid expanding agent is 1,1-dichloro-1-fluoro-2-chloro-2,2-difluoroethane.

* * * * *